US007812501B2

(12) United States Patent
Taniyama et al.

(10) Patent No.: US 7,812,501 B2
(45) Date of Patent: Oct. 12, 2010

(54) DYNAMO-ELECTRIC MACHINE ROTOR

(75) Inventors: Yoshihiro Taniyama, Tokyo (JP); Yasuo Kabata, Yokohama (JP); Hidekazu Shiomi, Chiba (JP); Kenmei Shimanuki, Yokohama (JP); Takaharu Tani, Yokohama (JP); Shozo Abe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 508 days.

(21) Appl. No.: 11/741,166

(22) Filed: Apr. 27, 2007

(65) Prior Publication Data

US 2007/0252473 A1 Nov. 1, 2007

(30) Foreign Application Priority Data

Apr. 28, 2006 (JP) .............................. 2006-125661

(51) Int. Cl.
*H02K 9/00* (2006.01)
(52) U.S. Cl. ......................................... 310/270; 310/52
(58) Field of Classification Search ................. 310/270, 310/65, 52, 58, 59, 61
See application file for complete search history.

(56) References Cited

U.S. PATENT DOCUMENTS

| | | | | |
|---|---|---|---|---|
| 5,644,179 A | * | 7/1997 | Staub et al. ................... 310/65 |
| 5,767,600 A | * | 6/1998 | Whiteley ..................... 310/184 |
| 6,204,580 B1 | * | 3/2001 | Kazmierczak ............... 310/52 |
| 6,346,754 B1 | * | 2/2002 | Kieda et al. ................... 310/58 |
| 6,498,408 B2 | * | 12/2002 | Tong et al. ..................... 310/65 |
| 6,617,749 B2 | * | 9/2003 | Salamah et al. ............. 310/270 |
| 6,628,020 B1 | * | 9/2003 | Tong ........................... 310/61 |
| 6,952,070 B1 | * | 10/2005 | Kaminski et al. ........... 310/270 |

FOREIGN PATENT DOCUMENTS

| JP | 09322454 A | * | 12/1997 |
|---|---|---|---|
| JP | 10336964 A | * | 12/1998 |

* cited by examiner

*Primary Examiner*—Quyen Leung
*Assistant Examiner*—Naishadh N Desai
(74) *Attorney, Agent, or Firm*—Oblon, Spivak, McClelland, Maier & Neustadt, L.L.P.

(57) ABSTRACT

It is an object of this invention to provide a dynamo-electric machine rotor which effectively and uniformly cools a rotor coil outside a rotor core by forming a ventilating groove in the rotor coil, tolerates large field current, and has high reliability. There is provided a dynamo-electric machine rotor in which spaced core slots are formed in a cylindrical rotor core 30, rotor coils 10 of stacked turns are fitted into the core slots to form multiple nested rings around a magnetic pole of the rotor, ends of the rotor coils are fixed by an retaining ring, and a spacer 20 is arranged in each of circumferential gaps between the ends of the rotor coils, wherein each spacer 20 has a length not more than the lengths of linear portions 12 at the ends of corresponding ones of the rotor coils 10, a cut-out 22 for ventilation of coolant gas is formed across at least one of two sides of the spacer, and the spacer is in contact with the rotor coils at the two sides of the spacer at a position located furthest inside in the radial direction of the rotor and an arbitrary position.

6 Claims, 15 Drawing Sheets

DYNAMO-ELECTRIC MACHINE ROTOR

BACKGROUND OF THE INVENTION

1. Field of the Invention

The present invention relates to a dynamo-electric machine rotor and, more particularly, to a rotor coil cooling structure configured to feed coolant gas between adjacent coil ends.

2. Related Art

A dynamo-electric machine such as a turbine generator is composed of a hollow cylindrical stator and a cylindrical rotor with a diameter somewhat smaller than that of the hollow portion which are concentrically arranged with an air gap between them. In each of the stator and rotor, conductive bars, i.e., so-called coils of copper or the like are arranged in the axial direction of core slots. When the rotor is rotated while its coils are energized, current is induced on the stator side.

At this time, since high heat is generated in the stator and rotor due to an electrical loss or the like, special cooling is required. The stator and rotor are forcedly cooled by feeding coolant gas into the machine by means of, e.g., placement of a fan in the rotor. In particular, the cooling performance of rotor coils which use rotational centrifugal force as the driving force for coolant gas is an important factor which influences the performance and build of a generator.

FIG. 29 shows a sectional view of ends of conventional rotor coils. FIG. 30 shows a horizontally spread-out view of the ends of the rotor coils. As shown in FIGS. 29 and 30, a conventional dynamo-electric machine rotor has a ventilating groove 10A in the longitudinal direction of each of rotor coils 10 and cools the rotor coils 10 by feeding coolant gas A through the grooves.

The rotor coils 10 of stacked turns are fitted into slots which are circumferentially formed at predetermined intervals in a core 30 integrated with a rotor shaft 13 to form multiple nested rings. Ends 10E of the rotor coils 10 which are located outside an end of the rotor core are held by an retaining ring 34 and an retaining ring support 35 against rotational centrifugal force. As shown in FIG. 29, the ends 10E of the rotor coils 10, whose outer side is surrounded by the retaining ring 34, are held at predetermined intervals while a spacer 20 shown in FIG. 31 is arranged between each two adjacent coils. An insulating cylinder 40 is inserted to maintain electrical insulation between the outermost portion of the rotor coil ends 10E and the retaining ring 34.

Since field current for energization flows through the rotor coils 10, electric heat is generated, and the temperatures of the coils rise. In addition to the insulating cylinder 40, insulators (not shown) are inserted between adjacent stacked turns of each rotor coil and between the core slots and the rotor coils, and the upper temperature limit is defined on the basis of the heat-proof temperatures of the insulators and the like.

As described above, coolant gas passes through an air gap between the rotor shaft 13 and the retaining ring support 35 and is guided to the retaining ring 34, and part thereof is guided to a ventilating channel in each rotor coil 10 from a ventilating inlet formed in a side of the rotor coil 10. The coolant gas guided into the ventilating channel of the rotor coil 10 flows through the ventilating channel in the longitudinal direction of the rotor coil 10, thereby cooling the rotor coil 10. After that, the coolant gas passes through a radial duct 14 in the core and is discharged to the outer periphery of the rotor.

In addition to this, a method is disclosed in National Publication of International Patent Application No. 2000-508508 or the like in which no ventilating groove is formed in a coil itself, a ventilating groove is formed in each side of a spacer arranged between coils, and partition plates are provided all around the inner periphery of rotor coils, thereby enhancing cooling between coils. As shown in FIG. 32, each partition plate has an opening near the border between a coil linear portion 12 and a coil circular portion 11, and cooling is performed by causing coolant gas to pass in the directions indicated by arrows.

However, in the cooling method, in which each rotor coil has the ventilating groove 10A, coolant gas flows in the longitudinal direction. Accordingly, the temperature of the coolant gas becomes higher toward the downstream side, and the temperature of one of the coils which is circumferentially distant from a magnetic pole center and is near the core end is higher than that of one near the magnetic pole center where an inlet 10B for coolant gas is located, as shown in FIG. 30. Also, the more distant from the center one of the rotor coils is, the longer the rotor coil is. Accordingly, the temperature of an outer coil is higher than that of an inner coil, and it is highly possible that the distribution of temperature becomes wider in the axial direction and circumferential direction of the rotor coils. FIG. 33 shows an example of a set of temperature distributions.

The temperatures of rotor coils are strictly limited by the upper temperature limit for a member used as an insulator for the coils. If the temperature is locally high at a part of a coil, there arises the need to limit field current and suppress the amount of heat generated even when the temperatures at other parts are sufficiently lower than the upper temperature limit. Accordingly, it is impossible to turn up a dynamo-electric machine. Also, if temperatures differ among coils of a large number of turns, shaft vibration occurs due to imbalance in thermal expansion among the rotor coils, and the reliability of the generator decreases.

On the other hand, in a method in which a ventilating groove is formed in each side of a spacer arranged between coils, and partition plates are provided below rotor coils outside a rotor core, thereby performing cooling between the coils, as in National Publication of International Patent Application No. 2000-508508, the flow rate of coolant gas passing through a ventilating groove in a spacer is lower than that of coolant as passing through a ventilating groove in a coil, and thus the cooling performance is lower. Also, the method requires components for the partition plates and man-hours for assembling them, thus leading to cost increase.

A rotor coil of a turbine generator is formed by stacking a plurality of turns each generally having a thickness of about several mm. Since the thin turns are not tightly bound nor held by one another, they each thermally stretch with an increase in temperature during the operation of the generator. For this reason, it is desirable for a spacer to be in contact with all turns at longitudinally identical positions, if possible.

However, in the invention described in National Publication of International Patent Application No. 2000-508508, a zigzag ventilating groove is formed in each side of a spacer. Accordingly, surfaces on a side of each spacer which are in contact with a coil are staggered and are discontinuous in the longitudinal direction. For this reason, the coil end holding power in the technique described in National Publication of International Patent Application No. 2000-508508 is lower than a rotor which uses a plain spacer without a ventilating groove in each side.

SUMMARY OF THE INVENTION

The present invention has been made in consideration of the above-described conventional drawbacks, and has as its object to provide a dynamo-electric machine rotor which can sufficiently cool a rotor coil with simple configuration without providing a component such as a partition plate and whose coil holding power is not impaired at an end of the rotor coil.

In order to achieve the object, according to the present invention, there are provided a dynamo-electric machine rotor in which spaced core slots are formed in a cylindrical rotor core, rotor coils of stacked turns are fitted into the core slots to form multiple nested rings around a magnetic pole of the rotor and, ends of the rotor coils are fixed by an retaining ring, and a spacer is arranged in each of circumferential gaps between the ends of the rotor coils, wherein each spacer has a length not more than lengths of linear portions at the ends of corresponding ones of the rotor coils, a cut-out is formed across at least one of two sides of the spacer which are in contact with the linear portions at the ends of the corresponding rotor coils except for a portion located inward in a radial direction of the rotor and an arbitrary portion to form a coolant gas ventilating channel having an axial extremity which communicates with a through hole formed in a tooth of the rotor core, and the spacer is in contact with the rotor coils at the portion located inward in the radial direction of the rotor and the arbitrary portion serving as remaining portions and a dynamo-electric machine rotor in which spaced core slots are formed in a cylindrical rotor core, rotor coils of stacked turns are fitted into the core slots to form multiple nested rings around a magnetic pole of the rotor, ends of the rotor coils are fixed by an retaining ring, and a spacer is arranged in each of circumferential gaps between the ends of the rotor coils, wherein each spacer has a length not more than lengths of linear portions at the ends of corresponding ones of the rotor coils, a cut-out is formed across at least one of two sides of the spacer which are in contact with the linear portions at the ends of the corresponding rotor coils except for a portion located inward in a radial direction of the rotor and an arbitrary portion to form a coolant gas ventilating channel having an axial extremity which bends toward space formed below the rotor coils, and the spacer is in contact with the rotor coils at the portion located inward in the radial direction of the rotor and the arbitrary portion serving as remaining portions, and a subslot which communicates with the space formed below the rotor coils is formed in the rotor core.

In the present invention, a cut-out is formed across a side of a spacer inserted between conductors of ends of rotor coils except for a portion located inward in a radial direction of a rotor and an arbitrary portion to facilitate ventilation of coolant gas. This makes it possible to effectively cool a rotor coil with simple configuration and provide a dynamo-electric machine rotor whose coil holding power is not impaired at an end of the rotor.

DETAILED DESCRIPTION OF THE INVENTION

Embodiments of the present invention will be explained below with reference to the drawings.

First Embodiment (Configuration)

Figure 1:
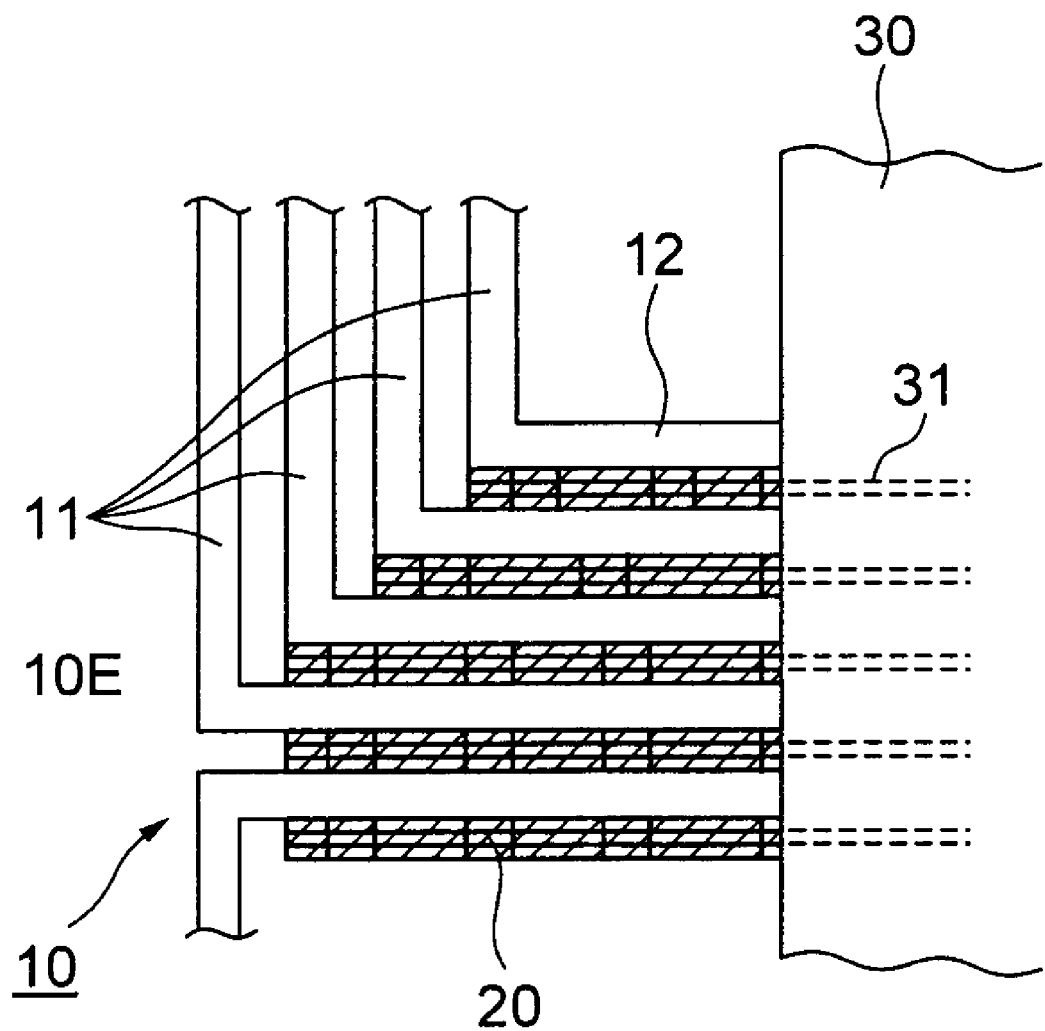
FIG. 1 is a plan view showing the locations of rotor coils and spacers outside a rotor core of a dynamo-electric machine according to a first embodiment of the present invention.

A first embodiment of the present invention will be explained with reference to FIGS. 1 to 13. FIG. 1 is a spread-out view of rotor coils 10 when an retaining ring and an insulating cylinder at an end of a rotor of a generator are removed, as seen from above. At ends 10E of the rotor coils 10, space is provided between coil conductors of each adjacent two of coil circular portions 11 which are located outside a rotor core 30, and an integral-type spacer 20 whose details are shown in FIGS. 2(A) to 2(D) is provided between each adjacent two of coil linear portions 12.

Figure 6:
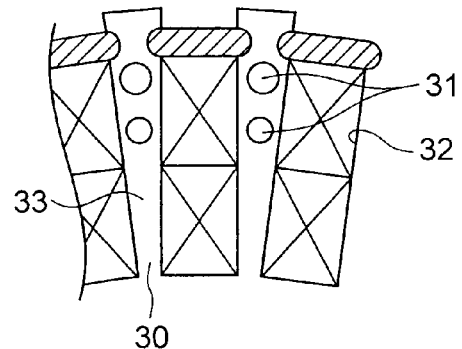
FIG. 6 is a view showing coolant gas through holes at an end of the rotor core according to the first embodiment of the present invention.

As will be described in detail later, each spacer 20 has two sides which serve as coil contacting portions. A plurality of cut-outs are longitudinally formed in each coil connecting portion, and a communicating hole is formed in each of remaining parts. The spacer 20 is configured to feed coolant gas through a ventilating channel which is composed of the cut-outs and communicating holes and feed the gas after cooling to through holes 31 formed in a tooth of the core. Note that two of the through holes 31 are vertically formed in a tooth 33 of the rotor core 30, as shown in FIG. 6.

Figure 2A:
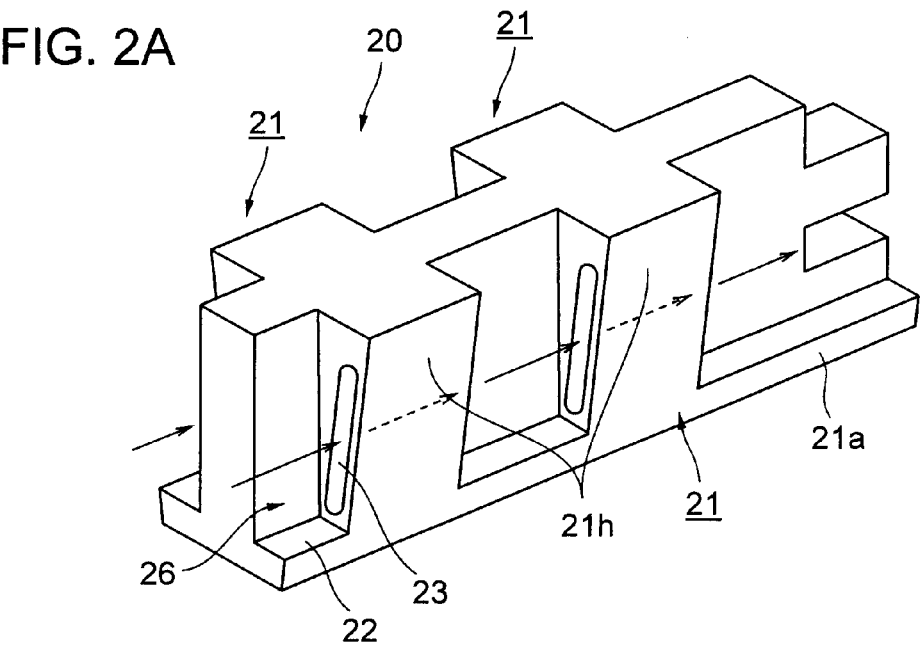
FIGS. 2(A) to 2(D) show a spacer for a rotor coil of the dynamo-electric machine according to the first embodiment of the present invention, FIG. 2(A) being a side view, FIG. 2(B) being a plan view, FIG. 2(C) being a cross-sectional view, FIG. 2(D) being an end view.
Figure 2B:
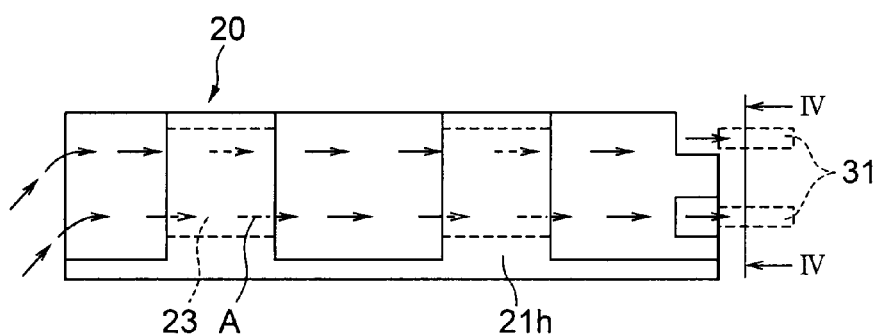
Figure 2C:
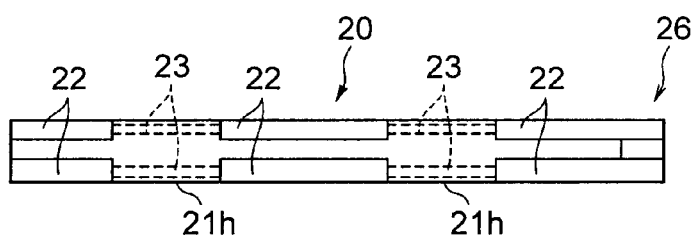
Figure 2D:
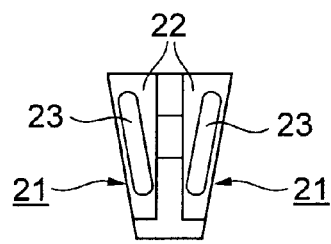

FIGS. 2(A) to 2(D) are views showing an example of a spacer. FIG. 2(A) is a perspective view, FIG. 2(B) is a side view, FIG. 2(C) is a top view, and FIG. 2(D) is an end view of FIG. 2(B) taken along line IV-IV, as seen from an outlet for coolant gas. The spacer 20 in this example has a plurality of cut-outs 22 longitudinally formed at predetermined intervals in each of surfaces which are in contact with one sides of the linear portions 12 of the corresponding rotor coils 10 shown in FIG. 1, i.e., each of two contacting portions 21. A communicating hole 23 is formed in a remaining portion sandwiched between each adjacent two of the cut-outs 22. The spacer 20 is configured to feed coolant gas through the cut-outs 22 and communicating holes 23, as indicated by arrows. The linear portions 12 at ends of the rotor coils 10 directly exchange heat with coolant gas in the cut-outs 22 and are cooled. In the case of the spacer 20 in FIGS. 2(A) to 2(D), parts 21h which are each sandwiched between the corresponding cut-outs 22 and a portion 21a located inward in the radial direction of the rotor which is at a lower portion of a side of the spacer 20 serve as remaining portions and constitute the contacting portion 21, as in FIG. 2(A), and hold a side of the linear portion 12 at the end 10E of the corresponding rotor coil 10.

Figure 3:
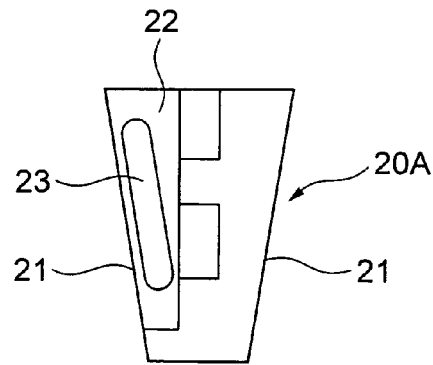
FIG. 3 is a sectional view of a spacer for a rotor coil according to a first application of the first embodiment of the present invention.
Figure 4A:
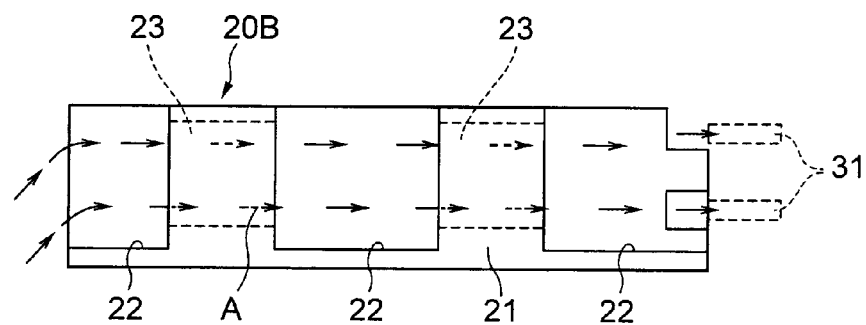
FIGS. 4(A) to 4(C) show a spacer for a rotor coil according to a second application of the first embodiment of the present invention, FIG. 4(A) being a left side view, FIG. 4(B) being a right side view, FIG. 4(C) being a cross-sectional view.
Figure 4B:
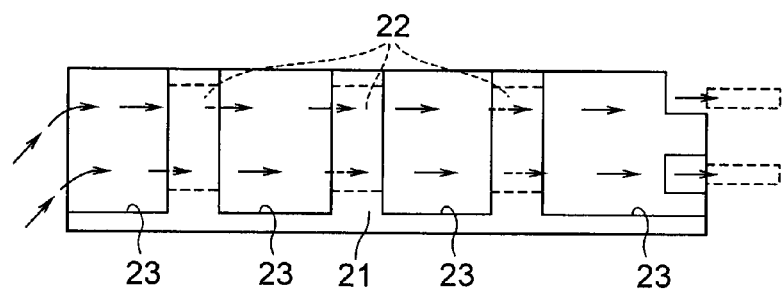
Figure 4C:
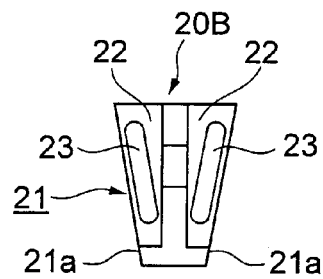

Note that the shape of the spacer 20 is not limited to that shown in FIGS. 2(A) to 2(D) and that the spacer 20 may be formed to have the shape shown in FIG. 3 or 4. FIG. 3 shows a spacer 20A which has the cut-outs 22 only in one side, the left side in FIG. 3. FIGS. 4(A) to 4(C) show a spacer 20B whose contacting portions 21 on the right and left sides are asymmetrical. Note that FIGS. 4(A), 4(B), and 4(C) are a front view, a rear view, and a right side view, respectively, of the spacer 20B.

Figure 5:
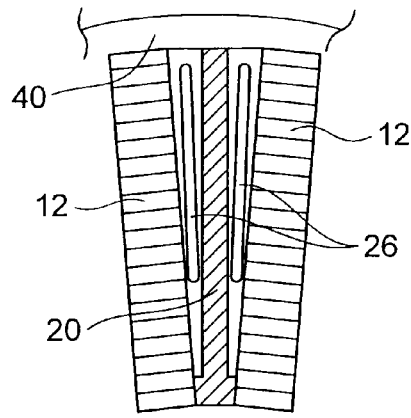
FIG. 5 is a view showing a section of the rotor coils and spacer placed according to the first embodiment of the present invention.

FIG. 5 shows a radial sectional view of the spacer 20 in FIGS. 2(A) to 2(D) placed between the linear portions 12 at ends of the corresponding rotor coils 10, taken at the cut-outs 22. A ventilating channel 26 which is independent of lower space formed between the linear portions 12 at ends of the corresponding rotor coils 10 and a rotor shaft is formed at a side of the corresponding rotor coil 10 by the spacer 20.

FIG. 6 is a cross-sectional view of the rotor core 30, with which an end face of each spacer 20 is in contact. The through holes 31 for discharging coolant gas, which communicate with the ventilating channels 26 of the spacer 20 and communicate with an air gap between the rotor and a stator, are formed in each tooth 33 between slots 32 containing the rotor coils 10.

The shape of each spacer need not be limited to one having one ventilating channel 26 on each side, as in the spacers 20, 20A, and 20B described above. Each spacer 20 may be formed such that the radially inward contacting portion 21a and a portion 21b near the center in the heightwise direction of the spacer 20 serve as a contacting portion which is in contact with a side of the corresponding rotor coil 10, thereby forming two horizontally split ventilating channels 26U and 26D at the side of the linear portion 12 of the rotor coil 10, as in, e.g., FIGS. 7(A) and 7(B) and 8.

Figure 7A:
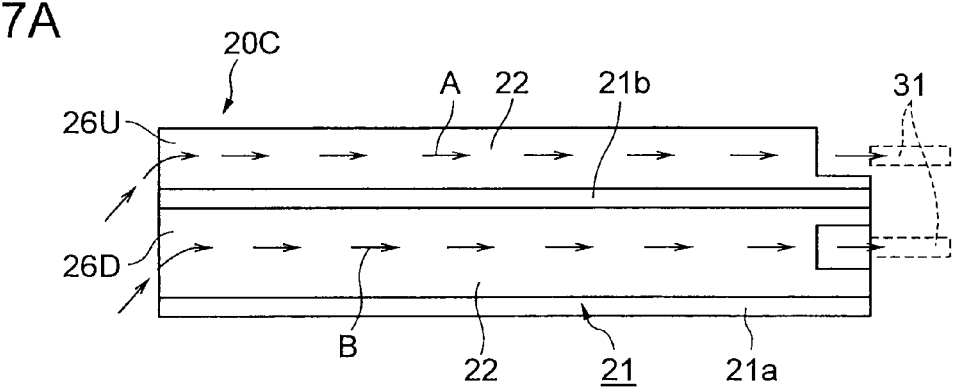
FIGS. 7(A) and 7(B) show a spacer for a rotor coil according to a third application of the first embodiment of the present invention, FIG. 7(A) being a side view, FIG. 7(B) being a cross-sectional view.
Figure 7B:
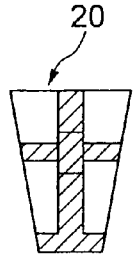
Figure 8:
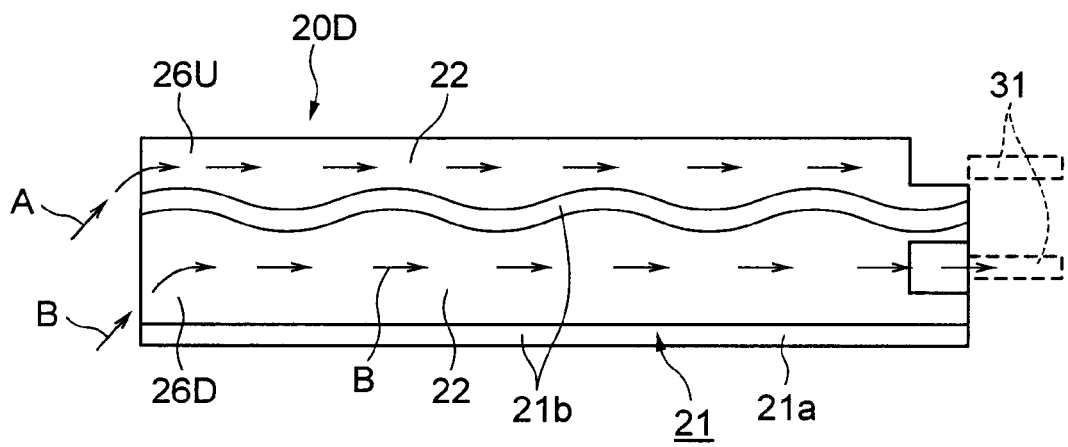
FIG. 8 is a side view of a spacer for a rotor coil according to a fourth application of the first embodiment of the present invention.

FIGS. 7(A) and 7(B) show a spacer 20C in which the cut-out 22 is split into upper and lower portions by the linear contacting portion 21b provided near the center in the heightwise direction. FIG. 8 shows a spacer 20D in which the contacting portion 21b is wavy. The flow directions of coolant gas are indicated by two rows A and B of arrows passing through the two ventilating channels 26U and 26D, which extend in the longitudinal direction of each of the spacers 20C and 20D.

Figure 9:
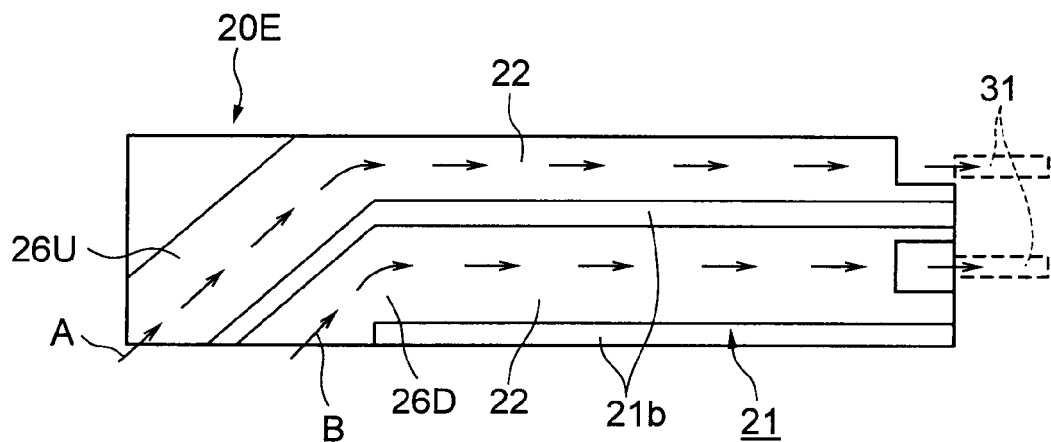
FIG. 9 is a side view of a spacer for a rotor coil according to a fifth application of the first embodiment of the present invention.
Figure 10:
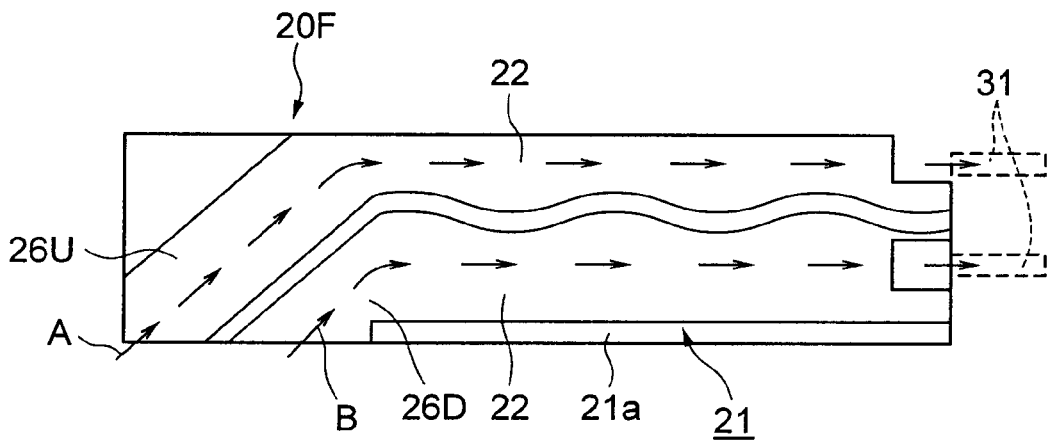
FIG. 10 is a side view of a spacer for a rotor coil according to a sixth application of the first embodiment of the present invention.

FIG. 9 shows an example of a spacer 20E in which the contacting portion 21b is doglegged downward, i.e., toward the rotor shaft at a fourth to third of the length of the spacer 20E from an inlet for coolant gas.

In the spacer 20E shown in FIG. 9, the contacting portion 21b, which horizontally splits the ventilating channel 26 into the ventilating channels 26U and 26D, is linear. In the case of a spacer 20F shown in FIG. 10, the contacting portion 21b is wavy.

Figure 11:
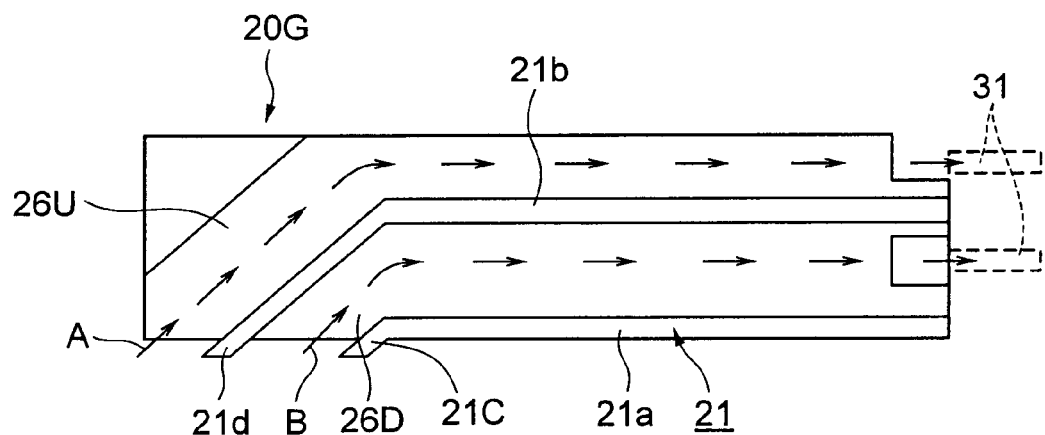
FIG. 11 is a side view of a spacer for a rotor coil according to a seventh application of the first embodiment of the present invention.
Figure 12:
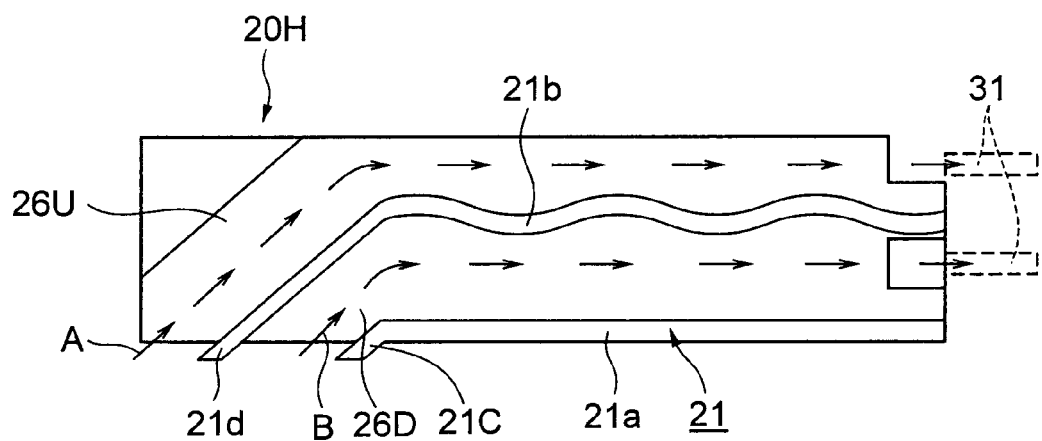
FIG. 12 is a side view of a spacer for a rotor coil according to an eighth application of the first embodiment of the present invention.

FIGS. 11 and 12 each show an example in which the radially inward contacting portion 21a and the contacting portion 21b, which diagonally extends downward, are further extended inward beyond the radially inward contacting portion 21a of an extremity on the coil circular portion 11 side, as in contacting portions 21c and 21d, to project to be further inside than the inner periphery of the coils 10. In this case, the contacting portion 21b, which horizontally splits the ventilating channel 26 into the ventilating channels 26U and 26D, may be linear, as in a spacer 20G in FIG. 11 or may be wavy, as in a spacer 20H in FIG. 12.

Figure 13:
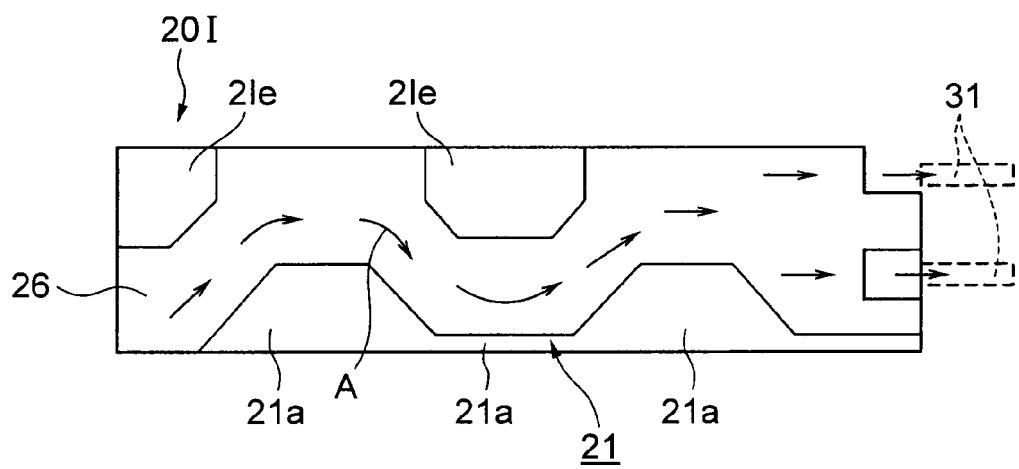
FIG. 13 is a side view of a spacer for a rotor coil according to a ninth application of the first embodiment of the present invention.

FIG. 13 shows a configuration in which the ventilating channel 26 at a side of the linear portion 12 of the corresponding rotor coil 10 is configured to meander, as indicated by the arrows A, by forming a rotor radially outward side contacting portions 21e and the radially inward contacting portion 21a of a spacer 20I to alternately project toward the ventilating channel 26.

(Operation)

Each of the spacers 20, 20A, ..., 20I, which are placed between the coil linear portions 12, is in contact with the coils 10 at its two sides at the radially inward contacting portions 21a, has cut-outs formed across the sides except for the radially inward contacting portions 21a, and is integrated with the coils 10 using a clip or the like. This configuration makes it possible to ensure the ventilating channel 26, which is separate from a channel formed between the linear portions 12 at ends of the coils 10 and the rotor shaft, at a side of the linear portion 12 of the coil 10. Since each spacer is of integral type, the cross-sectional area between the coils 10 decreases, and the flow rate of coolant gas flowing between the coils 10 can be increased. Also, formation of the through holes 31 in the teeth 33 between the slots of the rotor core 30 makes it possible to ensure outlets for coolant gas flowing between the linear portions 12 of the rotor coils 10.

It is possible to horizontally split the ventilating channel 26 at a side of each coil 10 by bringing the spacer 20 into contact with the coil 10 not only at the radially inward contacting portion 21a of the spacer 20 but also at the contacting portion 21b near the center in the heightwise direction of the spacer 20. Also, bending of the contacting portion 21b downward at about a fourth to third of the length of the spacer 20 from an extremity on the coil circular portion 11 side makes it possible to provide an inlet for coolant gas in the bottom surface of the spacer 20.

Additionally, the radially outward side contact surfaces 21e and radially inward contact surface 21a of each spacer 20 formed to alternately project toward the ventilating channel 26 makes it possible to enhance the holding power of the spacer 20.

(Effect)

Figure 28:
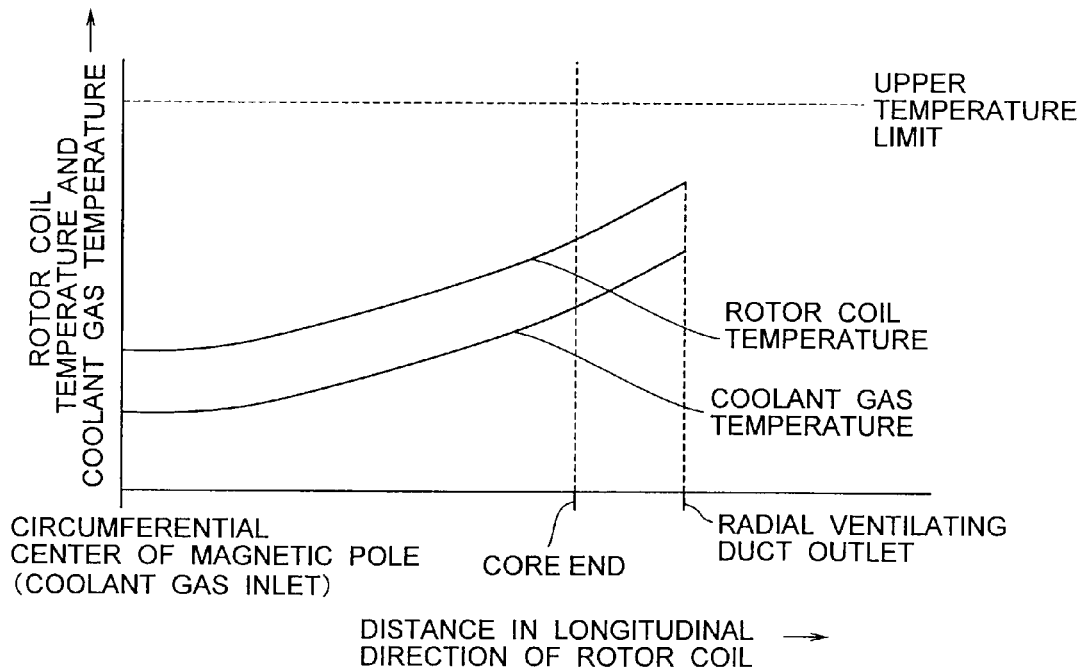
FIG. 28 is a graph showing temperature distributions in the longitudinal direction of the rotor coil when the present invention is applied.
Figure 29:
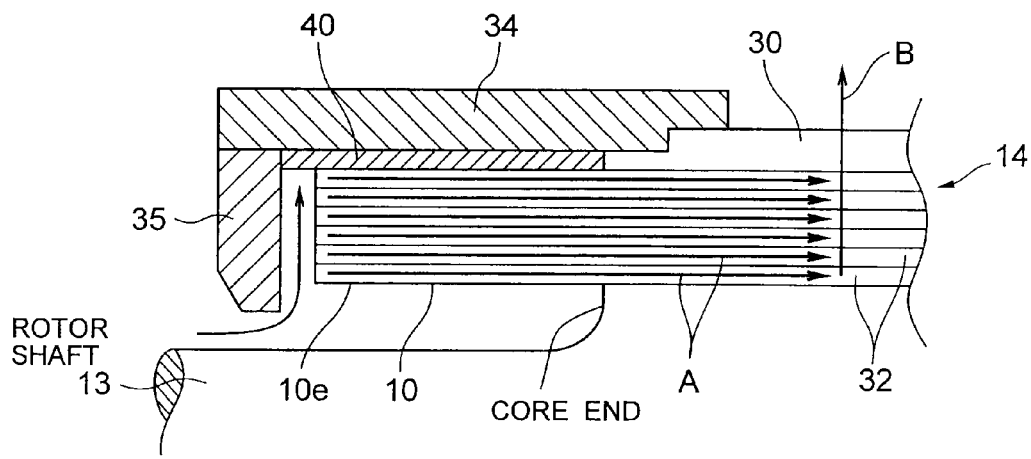
FIG. 29 is an axial sectional view showing the configuration of a conventional dynamo-electric machine rotor.
Figure 30:
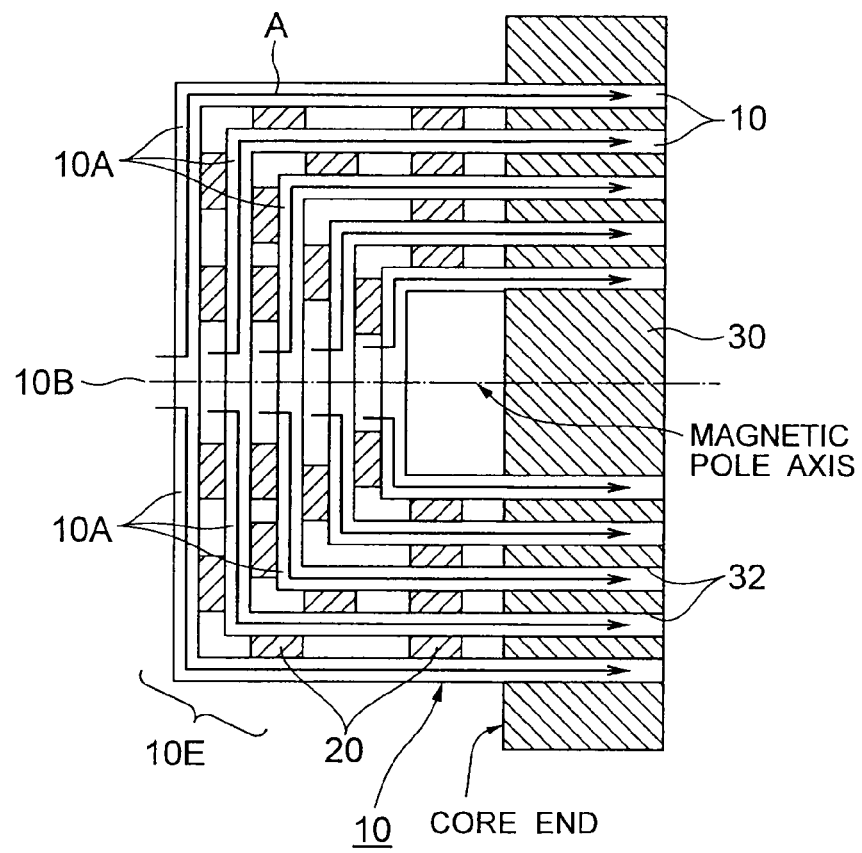
FIG. 30 is a horizontally spread-out view of a conventional rotor coil.
Figure 31:
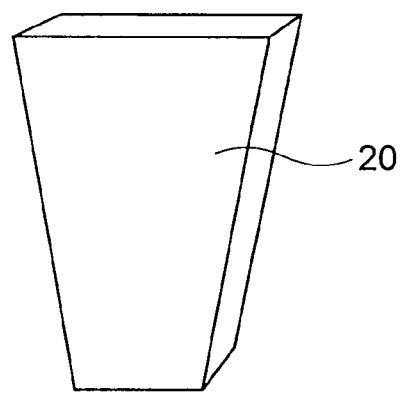
FIG. 31 is a perspective view showing a spacer for the conventional rotor coil.
Figure 32:
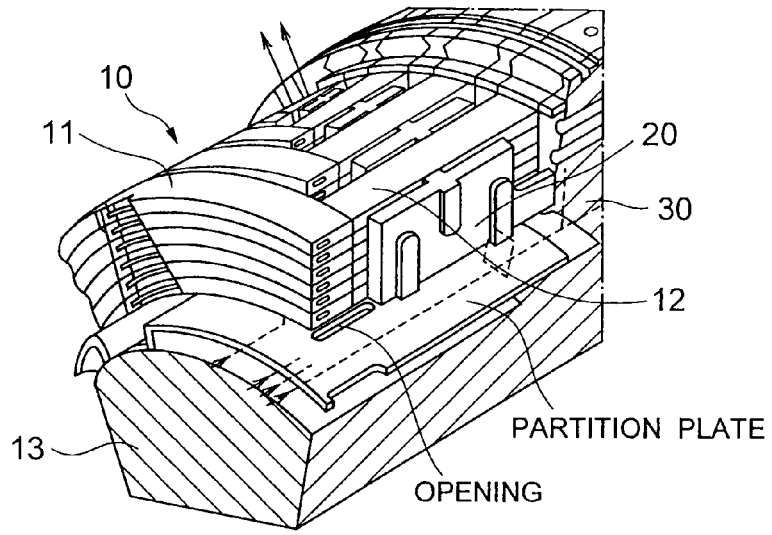
FIG. 32 is a perspective view showing a conventional rotor coil.
Figure 33:
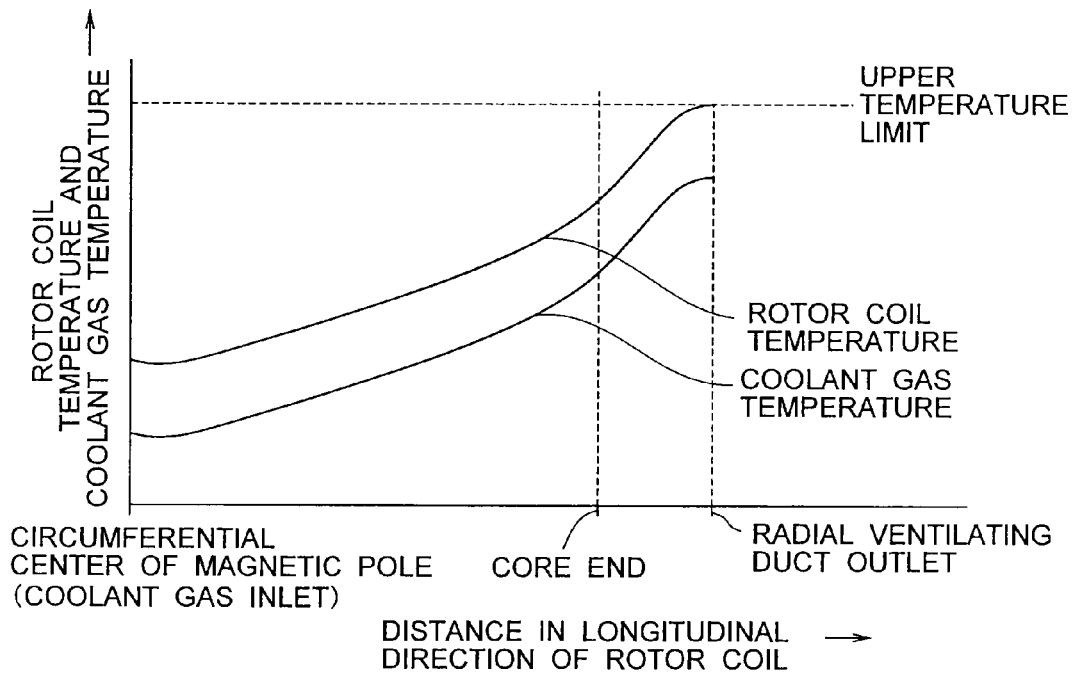
FIG. 33 is a graph showing temperature distributions in the longitudinal direction of the conventional rotor coil.

As described above, according to the first embodiment, the ventilating channel 26, which is separate from a channel below the coils 10, is provided at a side of each coil 10 using any of the spacers 20 to 20I. Since coolant gas guided to the radially outward side by rotational centrifugal force is taken in and does not return to the channel below the coils 10, coolant gas can be effectively used to cool the sides of the coils 10. This makes it possible to achieve temperature distributions as shown in FIG. 28 better than those of a conventional rotor shown in FIG. 33. Also, it is possible to perform uniform cooling by changing the positions of the contacting portions 21 of each spacer 20.

Provision of the through holes 31 for discharging coolant gas flowing between the coils 10 toward the air gap in the teeth 33 of the rotor core 30 makes it possible to discharge coolant gas whose temperature is increased after cooling between the coils 10 toward the air gap without letting the coolant gas flow into the rotor. The configuration is advantageous to a large rotating machine which requires minimization of the temperature of gas flowing into the rotor.

Horizontal splitting of the ventilating channel 26 at a side of the coil 10 into two makes it possible to reduce imbalance, i.e., restrain much of coolant gas from flowing to the radially outward side due to centrifugal force and perform uniform cooling. By forming the coil contacting portion 21b of the spacer 20 for splitting the ventilating channel 26 into two to be wavy, it is possible to axially change a turn position where the coil is not cooled and expect uniform cooling.

Placement of an inlet for coolant gas in the bottom surface of each spacer 20 makes it possible to make more use of the effects of rotational centrifugal force and increases the opening area. Accordingly, a pressure drop at the inlet can be reduced. Extension of the contacting portions 21a and 21b, which are to come into contact with the coil 10, to below the coil, as in the contacting portions 21c and 21d, is expected to increase the uptake of gas. The radially outward side contacting portions 21e and the radially inward contacting portion 21a of each spacer 20 formed to alternately project toward the ventilating channel 26 make it possible to increase the area of contact with the coil 10. A large-capacity machine whose coils 10 have high heat stretchability can ensure cooling power and holding power.

Second Embodiment (Configuration)

Figure 14:
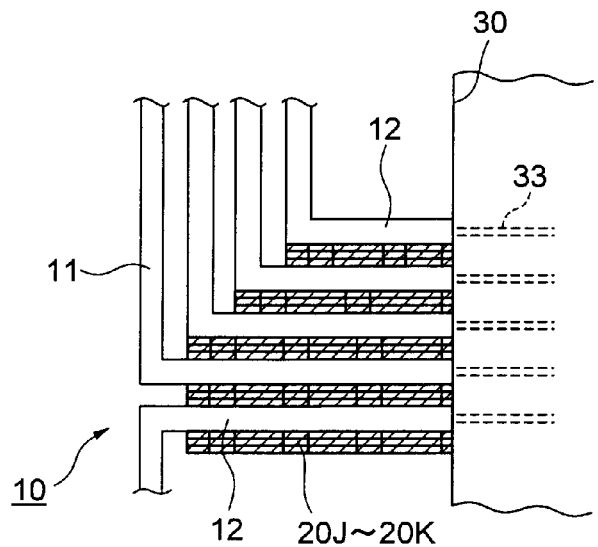
FIG. 14 is a plan view showing the locations of rotor coils and spacers outside a rotor core of a dynamo-electric machine according to a second embodiment of the present invention.
Figure 15A:
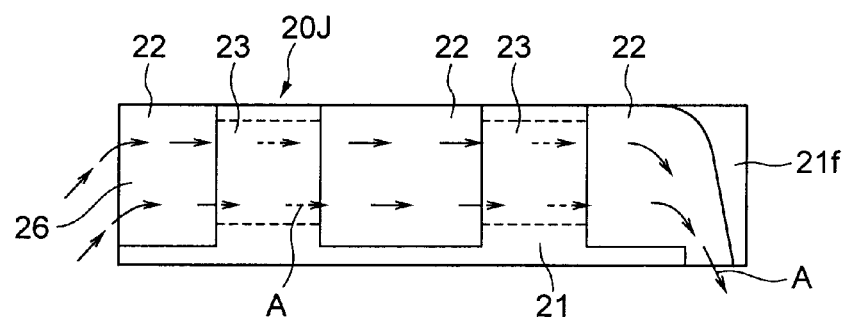
FIGS. 15(A) to 15(C) show a spacer for a rotor coil according to the second embodiment, FIG. 15(A) being a side view, FIG. 15(B) being a plan view, FIG. 15(C) being a cross-sectional view.
Figure 15B:
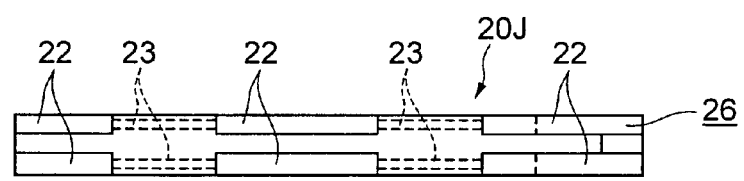
Figure 15C:
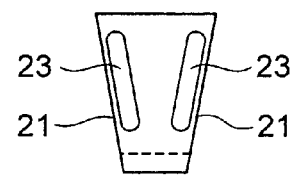
Figure 16:
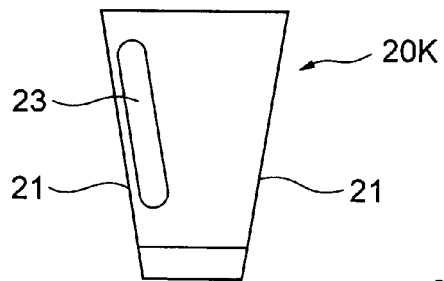
FIG. 16 is a cross-sectional view of a spacer for a rotor coil according to a first application of the second embodiment of the present invention.
Figure 17A:
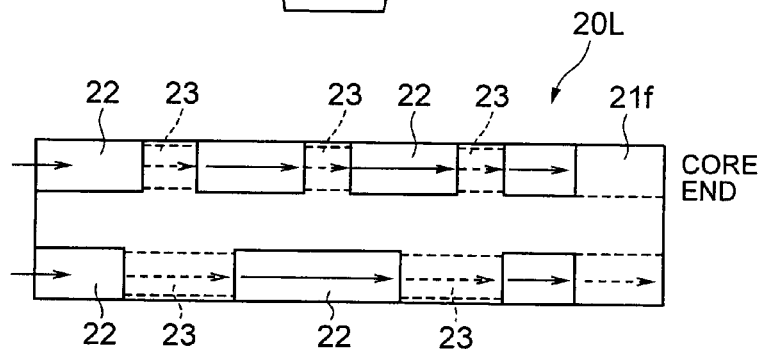
FIGS. 17(A) to 17(D) show a spacer for a rotor coil according to a second application of the second embodiment of the present invention, FIG. 17(A) being a plan view, FIG. 17(B) being a cross-sectional view, FIG. 17(C) being a front view, FIG. 17(D) being a rear view.
Figure 17B:
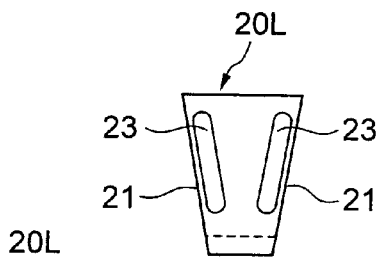
Figure 17C:
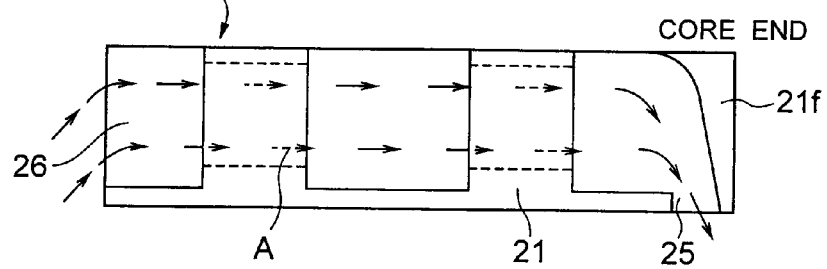
Figure 17D:
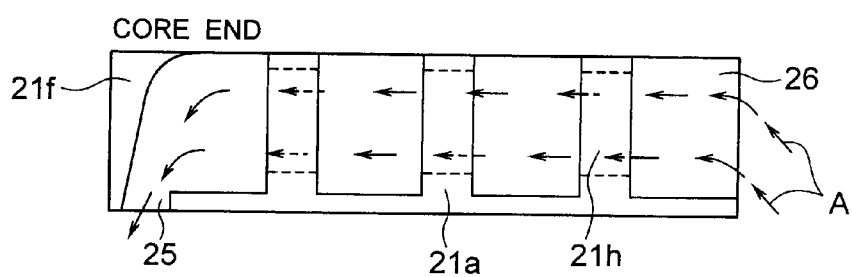

A second embodiment of the present invention will be explained with reference to FIGS. 14 to 27. FIG. 14 shows a spread-out view of rotor coils 10 at an end of a rotor of a generator, as seen from above. An integral-type spacer 203 shown in FIGS. 15(A) to 15(C) is provided between coil linear portions 12 at ends of each adjacent two of the rotor coils 10, which are located outside a rotor core 30. As shown in FIG. 15(A), the spacer 20J has a contacting portion 21f which bends coolant gas A to the radially inward of the rotor near an outlet and discharges the coolant gas A. After the coolant gas A is discharged to between the corresponding coils 10 and a rotor shaft, it flows into a subslot 32a which is formed below a core slot portion 32. Note that the spacer 20J may be placed between coil circular portions 11. The spacer 20J in FIGS. 15(A) to 15(C) has cut-outs in each of surfaces which are in contact with one side of the linear portions 12 at an end of the corresponding rotor coils 10. However, each spacer may have a cut-out only in one side, as in a spacer 20K shown in FIG. 16, or may have cut-outs such that contacting portions 21 on the right and left sides which are in contact with the corresponding coils 10 are asymmetrical, as in a spacer 20L shown in FIGS. 17(A) to 17(D). Basically, each spacer only needs to be structured to come into contact with the corresponding coil linear portions 12 at its radially inward contacting portions. Note that FIG. 17(A) is a plan view, FIG. 17(B) is a cross-sectional view, FIG. 17(C) is a front view, and FIG. 17(D) is a rear view.

Figure 18:
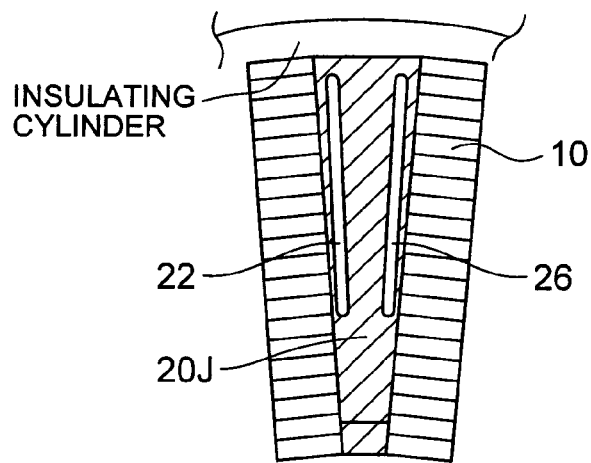
FIG. 18 is a sectional view showing a state in which the spacer is placed between the rotor coils according to the second embodiment of the present invention.
Figure 19:
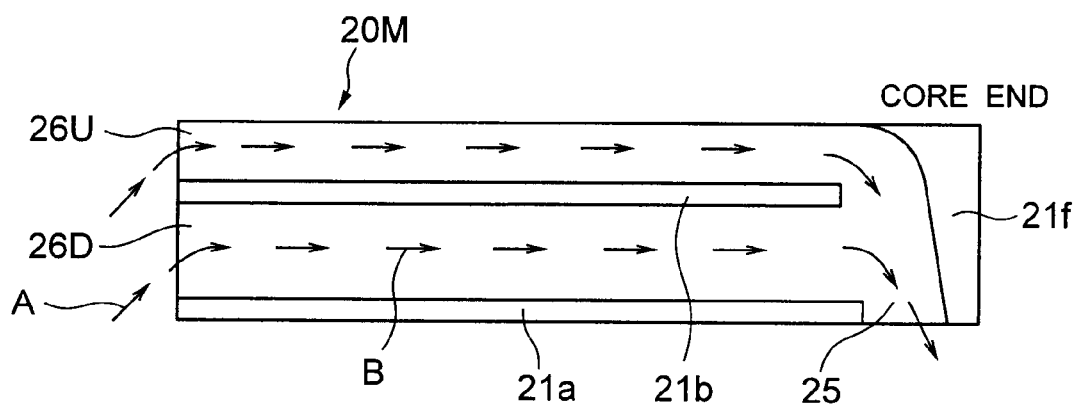
FIG. 19 is a side view of a spacer for a rotor coil according to a third application of the second embodiment of the present invention.
Figure 20:
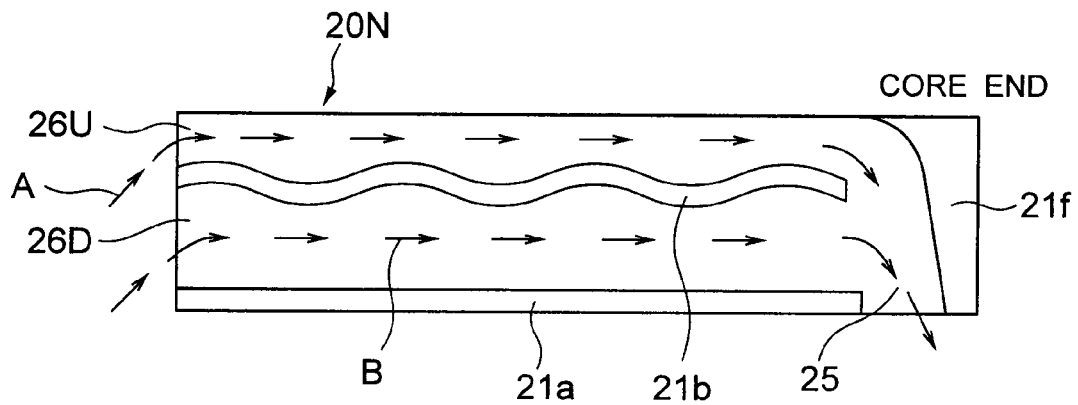
FIG. 20 is a side view of a spacer for a rotor coil according to a fourth application of the second embodiment of the present invention.

FIG. 18 shows a radial sectional view of the spacer 20J in FIGS. 15(A) to 15(C) placed between the linear portions 12 at ends of the corresponding rotor coils 10. A ventilating channel 26 which is independent of lower space formed between the corresponding coils 10 and the rotor shaft is formed at a side of the corresponding coil 10 by the spacer 20J.

An outlet 25 is formed in the ventilating channel 26 immediately in front of an end of the rotor core 30 by removing a part of a coil contacting portion 21a on the radially inward side of the spacer 20J. The spacer 20J is configured to discharge coolant gas to space located further inside than the inner periphery of ends of the corresponding coils 10 which is formed between the coils 10 and the rotor shaft.

Note that each spacer 20 may be formed such that the radially inward contacting portion 21a and a contacting portion 21b near the center in the heightwise direction of the spacer 20 are in contact with the coil 10 to split the ventilating channel 26 at a side of the corresponding coil 10. The ventilating channel 26 may be split such that the contacting portion 21b in contact with the corresponding coil 10 is linear, as in a spacer 20M in FIG. 19, or such that it is wavy, as in a spacer 20N in FIG. 20, and coolant gas may be discharged from the outlet 25.

Figure 21:
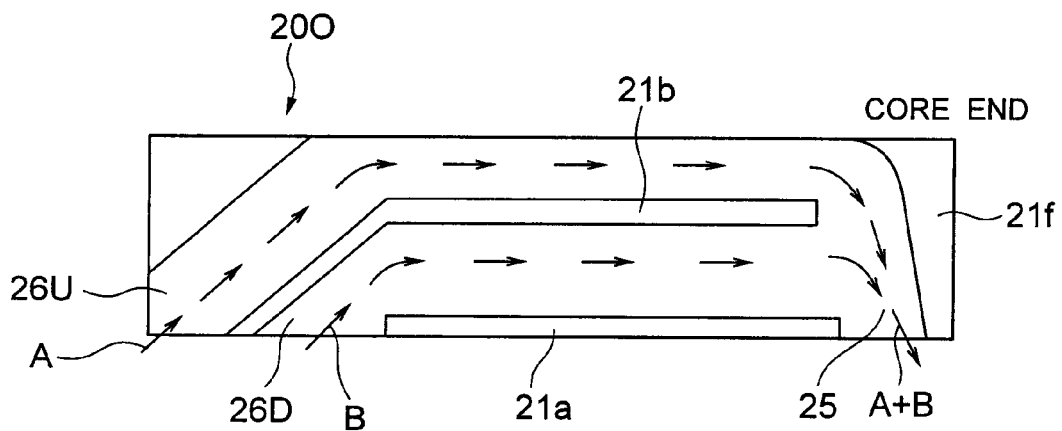
FIG. 21 is a side view of a spacer for a rotor coil according to a fifth application of the second embodiment of the present invention.
Figure 22:
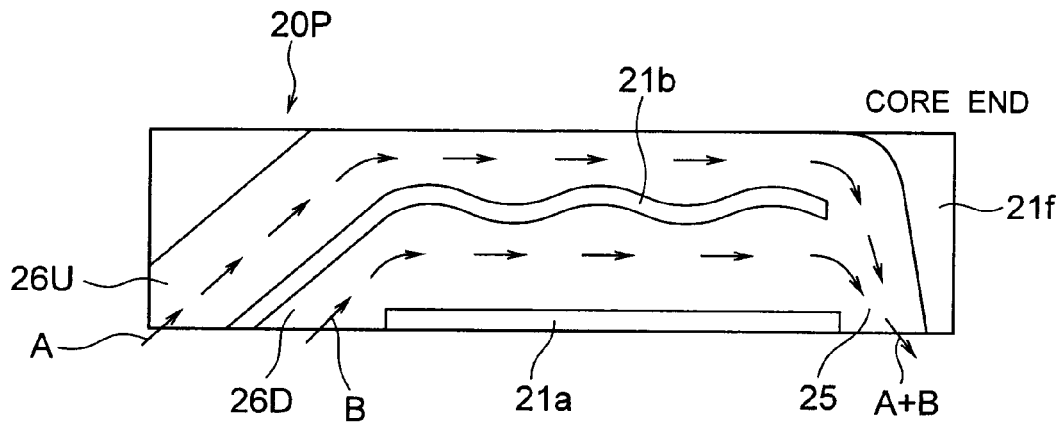
FIG. 22 is a side view of a spacer for a rotor coil according to a sixth application of the second embodiment of the present invention.

As shown in FIG. 21, a spacer 20O may be formed such that about a fourth to third of the spacer 20O from an extremity on the coil circular portion 11 side is not in contact with the linear portion 12 of the corresponding coil 10 at the bottom surface of the spacer 20O and such that a part of the contacting portion 21b horizontally splitting the ventilating channel 26 formed at a side of an end 10E of the coil 10 which is in the fourth to third may be diagonally extended downward to the radially inward side of the extremity on the coil circular portion 11 side of the spacer 20O. At this time, the contacting portion 21b, which horizontally splits the ventilating channel 26, may be linear, as shown in FIG. 21, or may be wavy, as in a spacer 20P shown in FIG. 22.

Figure 23:
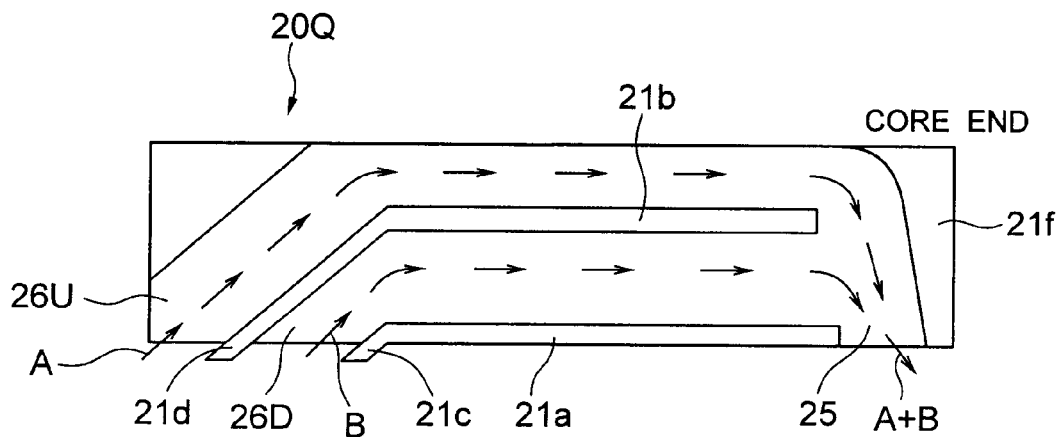
FIG. 23 is a side view of a spacer for a rotor coil according to a seventh application of the second embodiment of the present invention.
Figure 24:
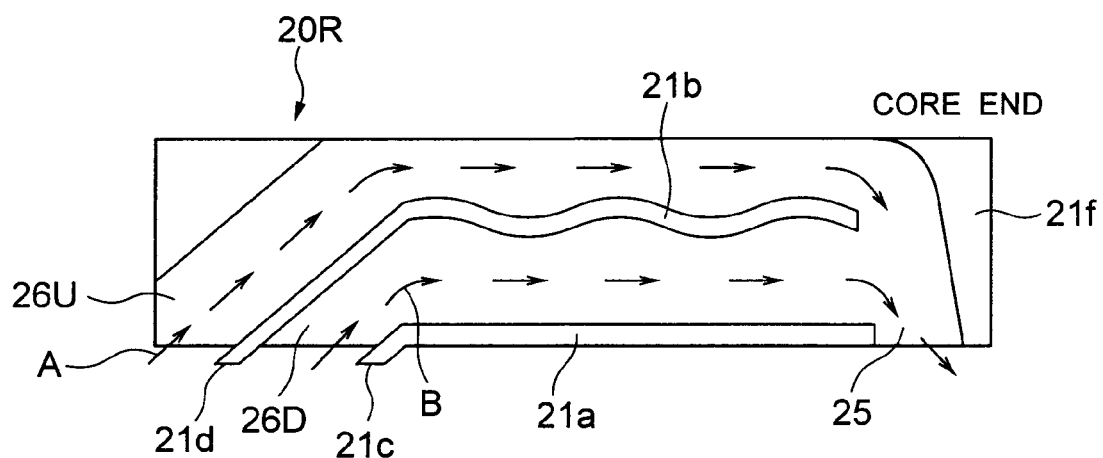
FIG. 24 is a side view of a spacer for a rotor coil according to an eighth application of the second embodiment of the present invention.
Figure 25:
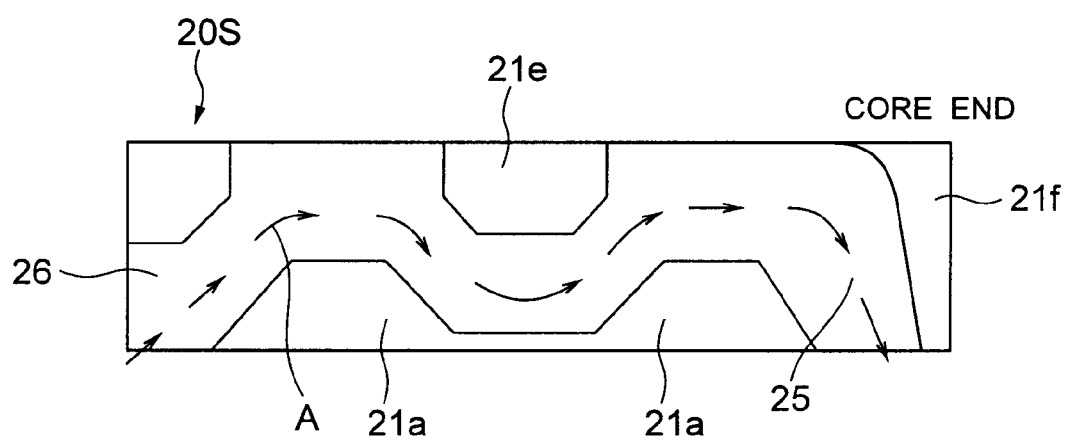
FIG. 25 is a side view of a spacer for a rotor coil according to a ninth application of the second embodiment of the present invention.

As in a spacer 20Q shown in FIG. 23, the contacting portions 21a and 21b, which diagonally extend downward, may be further extended inward beyond the radially inward contacting portion 21a of an extremity on the coil circular portion 11 side, as in contacting portions 21c and 21d, to project to below the corresponding coil 10. At this time, the contacting portion 21b, which splits the ventilating channel 26, may be linear, as in the spacer 20Q shown in FIG. 23, or may be wavy, as in a spacer 20R shown in FIG. 24. As in a spacer 20S shown in FIGS. 25, radially outward contacting portions 21e which are to come into contact with an insulating cylinder in FIG. 27 and the radially inward contacting portion 21a on the core 30 side may be provided to alternately project toward the ventilating channel 26, and a channel at a side of each coil 10 may be configured to meander.

Figure 26:
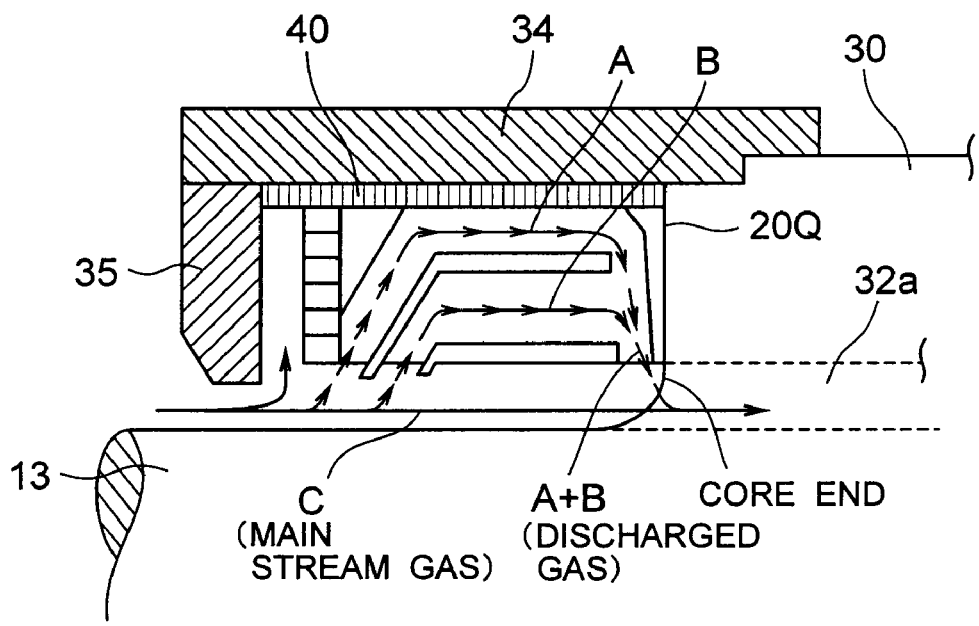
FIG. 26 is a side view showing the flow of cooling air in the spacer according to the second embodiment of the present invention.
Figure 27:
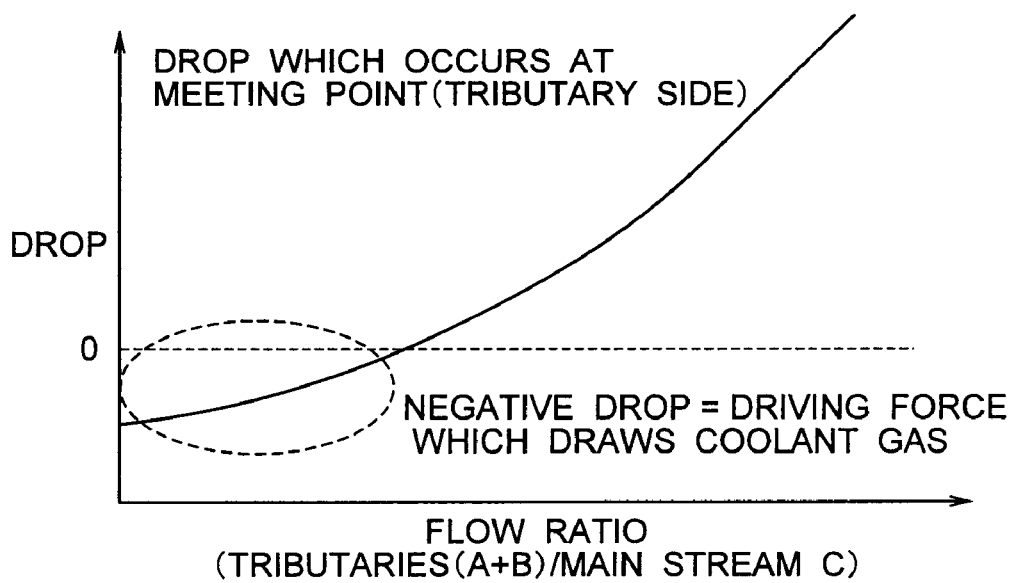
FIG. 27 is a graph showing a flow ratio versus pressure drop characteristic which serves as a basis for cooling action by the flow of the cooling air in FIG. 26.

FIG. 26 shows a sectional view of the end of the rotor, which uses the spacer 20Q. FIG. 27 is a graph showing the relationship between gas discharged from the spacers 20J to 20S and coolant gas (main stream).

As shown in FIG. 26, a stream of coolant gas flowing from the left side of FIG. 26 along the rotor shaft passes by an retaining ring support 35 provided at the left end (with respect to FIG. 26) of an retaining ring 34 and is split into a main stream C which travels straight ahead to the right (with respect to FIG. 26) along the rotor shaft, streams A and B which pass through ventilating channels 26U and 26D provided in the spacer 20Q, and a stream which heads upward (with respect to FIG. 26) away from the rotor shaft.

When the streams A and B having passed through the ventilating channels 26U and 26D provided in the spacer 20Q reach the core end, they meet the main stream C having flown along the rotor shaft and flow into the subslot 33 formed to axially extend through the core. After the streams cool the rotor core, they are discharged from an air gap.

A drop as shown in FIG. 27 occurs at the meeting of the two streams. More specifically, assuming that the main stream C is a stream along the rotor shaft and that the tributaries A and B are streams flowing through the spacer, a pressure drop with respect to a flow ratio is plotted with the abscissa representing the flow ratio between the tributaries and the main stream and the ordinate representing a pressure drop. As shown in FIG. 27, the drop is negative when the flow ratio is small and turns positive and increases as the flow ratio increases. That is, the characteristic shown in FIG. 27 has a positive slope.

The cooling effect of the coils is enhanced by using the drawing action of the main stream (the coolant gas stream C along the rotor shaft) on the tributaries (the coolant gas streams A and B passing through the spacer) in a region where the flow ratio is small.

(Operation)

Each of the spacers 20J to 20S, which are placed between the coil linear portions 12 at ends of the rotor coils 10, is in contact with the coil linear portions 12 at its two sides at radially inward side contact surfaces, has cut-outs formed across the sides except for the radially inward side contact surfaces, and is integrated with the coils 10 using a clip or the like. This configuration makes it possible to ensure the ventilating channel 26, which is separate from a channel formed between the coil linear portions 12 and the shaft, at one side or two sides of the coil linear portion 12. Also, since each spacer is of integral type, the cross-sectional area between the coils 10 decreases, and the flow rate of coolant gas flowing between the coil linear portions 12 can be increased. Additionally, it is possible to ensure outlets for coolant gas flowing between the coil linear portions 12 by forming each of the spacers 20J to 20L such that coolant gas is discharged to space below the coil linear portions 12 immediately in front of the end of the rotor core 30.

Provision of not only the radially inward contacting portion 21a but also the contacting portion 21b, which is in contact with the coil 10 near the center in the heightwise direction of a spacer 20, as in the spacers 20M to 20R, makes it possible to horizontally split the ventilating channel 26 into two at a side of the coil 10. Also, bending of the contacting portion 21b downward at about a fourth to third of the length of each of the spacers 20O to 20R from an extremity on the coil circular portion 11 side makes it possible to provide an inlet for coolant gas inlet in the bottom surface of the spacer 20.

Additionally, the radially outward contacting portions 21e and radially inward contacting portion 21a formed to alternately project toward the ventilating channel 26, as in the spacer 20S, makes it possible to enhance the holding power of the spacer 20.

(Effect)

As described above, according to the second embodiment, a ventilating channel which is separate from a channel formed between the coil linear portions 12 and the shaft is provided at a side of the coil linear portion 12 at an end of each rotor coil 10 using any of the spacers 20J to 20S. With this configuration, coolant gas guided to the radially outward side by rotational centrifugal force is taken in, and the coolant gas can be effectively used to cool the side of the coil linear portion 12 while the coolant gas is passing by the side of the coil linear portion 12. This makes it possible to achieve temperature distributions better than those of a conventional rotor as shown in FIG. 28.

It is possible to perform uniform cooling by axially changing the positions of the contacting portions 21 of each of the spacers 20J to 20S. The shape of each of the spacers 20J to 20S makes it possible to return coolant gas to a channel formed between an end of the coil 10 and the rotor shaft immediately in front of the rotor core 30 and feed the coolant gas through the subslot 33. Accordingly, the configuration is advantageous to a small rotating machine in, e.g., that it eliminates the need to form the through hole 31 in the tooth 33 of the core 30 and can reduce the cost.

Horizontal splitting of the ventilating channel 26 at a side of the coil linear portion 12 into two makes it possible to reduce imbalance, i.e., restrain much of coolant gas from flowing to the radially outward side due to centrifugal force and perform uniform cooling. By forming the coil contacting portion 21b of the spacer 20 for splitting the ventilating channel 26 into two to be wavy, it is possible to further axially change a turn position where the coil is not cooled and expect uniform cooling.

Placement of an inlet for coolant gas of each of the spacers 20O to 20S between an end of the coil 10 and the rotor shaft makes it possible to make more use of the effects of rotational centrifugal force and increases the opening area. Accordingly, a pressure drop at the inlet can be reduced. Extension of the contacting portions 21, which are to come into contact with the linear portion 12 at an end of the coil 10, to below the coil, as in the contacting portions 21c and 21d, is expected to increase the uptake of gas. The radially outward side contact surfaces and radially inward side contact surface of the spacer 20S formed to alternately project toward the ventilating channel 26 make it possible to increase the area of contact with the linear portion 12 at an end of the coil 10. A large-capacity machine whose coils have high heat stretchability can ensure cooling power and holding power.

What is claimed is:

1. A dynamo-electric machine rotor in which spaced core slots are formed in a cylindrical rotor core, rotor coils of stacked turns are fitted into the core slots to form multiple nested rings around a magnetic pole of the rotor, ends of the rotor coils are fixed by a retaining ring, and a spacer is arranged in each of circumferential gaps between the ends of the rotor coils, wherein each spacer includes contacting portions formed on at least one of two sides of the spacer, one of the contacting portions being formed at a radially inward position of the spacer and an other being formed at a radially outward position of the spacer, for forming coolant gas ventilating channels between the spacer, the rotor coils and the retaining ring, said coolant gas ventilating channels being radially separated into plurality, one being radially inward and an other being outward, and extending along a longitudinal direction of the spacer except for inlet portions of the coolant gas ventilating channels.

2. The dynamo-electric machine rotor according to claim 1, wherein
   at least one of the contacting portions are meandering along the longitudinal direction of the spacer.

3. The dynamo-electric machine rotor according to claim 1, wherein
   at least one of the contacting portions include extensions which diagonally extend downward from their extremities to portions located farthest inside in a radial direction of the rotor at extremities on curved portion sides of the coils.

4. The dynamo-electric machine rotor according to claim 1, wherein
   the contacting portions are in contact with the coils continuously from the inlet through to an outlet of the coolant gas ventilating channels along more than half of a linear portion of each of the coils from an extremity on a rotor core side, at a position located inward in a radial direction of the rotor.

5. The dynamo-electric machine rotor according to claim 1, wherein
   the contacting portions are in contact with the coils at the two sides along more than half of a linear portion of each of the coils from an extremity on a rotor core side, at a position located inward in a radial direction of the rotor.

6. A dynamo-electric machine comprising a rotor according to claim 1.

* * * * *